May 20, 1958 R. H. CLINE 2,835,225
ANIMAL INSECTICIDE APPLICATOR
Filed Oct. 21, 1954

INVENTOR.
Robert H. Cline
BY
*Horace B. Van Valkenburgh*
ATTORNEY

United States Patent Office 2,835,225
Patented May 20, 1958

2,835,225
ANIMAL INSECTICIDE APPLICATOR
Robert H. Cline, Denver, Colo.
Application October 21, 1954, Serial No. 463,686
6 Claims. (Cl. 119—157)

This invention relates to animal insecticide applicators, and more particularly to an applicator for applying insecticide or the like to animals, such as cattle, wherein the animal itself furnishes the relative movement between the applicator and the animal.

Applicators for applying insecticides to cattle and the like have been proposed which include a body of absorbent material mounted on a chain and against which the cattle would rub, the chain preferably being provided with a section in the center pivotally attached to other chain sections which are mounted on a post and an anchor, so that the absorbent material would be solid on the pivoted chain section. In such an applicator, the absorbent material is covered with a longer wearing material provided with a hole adjacent the upper end, so that a liquid insecticide solution could be forced through the hole to saturate the absorbent material. However, such an applicator requires considerable time and attention, since if enough insecticide is poured in to last for a considerable time, a large amount thereof will drip out onto the ground and be lost. Also, absorbent material once saturated cannot receive any additional solution so that the maximum amount of solution lasts only a short while. Furthermore, the absorbent material is difficult to place in a covering.

Among the objects of the present invention are to provide an improved applicator for applying an insecticide solution to animals, such as cattle and the like; to provide such an applicator which will be supplied with an insecticide solution which will last for a considerable period of time; to provide such an applicator in which the insecticide solution is used only in accordance with the need therefor; to provide such an applicator which includes absorbent material which is substantially saturated with an insecticide solution or the like and remains saturated, but does not contain an excess of solution which can be lost due to drippage and the like; to provide such an applicator which will be attractive to cattle and thereby induce use of the same; to provide such an applicator which is sturdy in construction and will withstand heavy usage; to provide such an applicator with which cattle can reach substantially all portions of their bodies; and to provide such an applicator which can be manufactured efficiently and relatively economically.

Additional objects and the novel features of this invention will become apparent from the description which follows, taken in connection with the accompanying drawing, in which.

Figure 1:
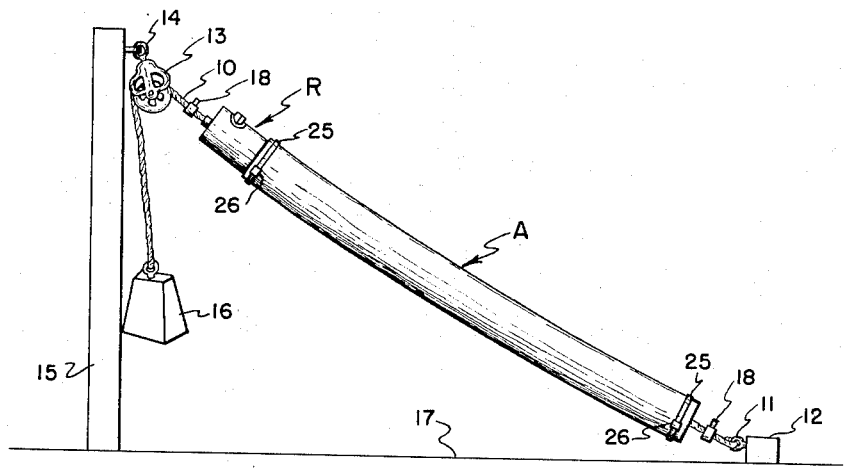
Fig. 1 is a front elevation of an applicator constructed in accordance with this invention.
Figure 2:
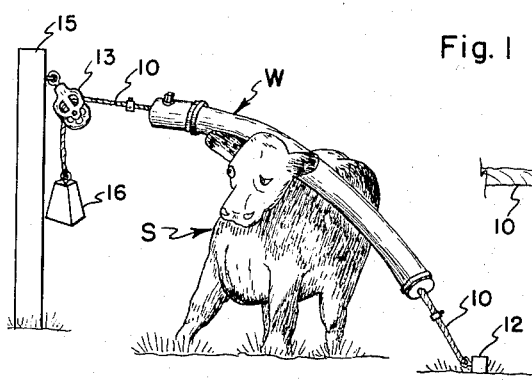
Fig. 2 is a view similar to Fig. 1, on a slightly smaller scale, illustrating use thereof by a steer.
Figure 4:
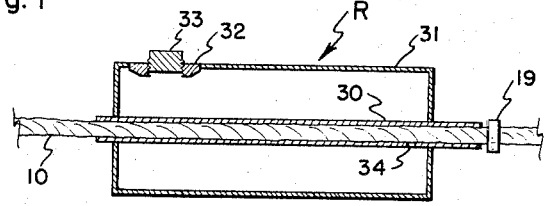
Fig. 4 is a fragmentary, enlarged longitudinal section of a solution reservoir and associated parts.
Figure 5:
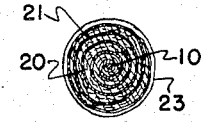
Fig. 5 is an enlarged cross section taken along line 5—5 of Fig. 3.

An applicator constructed in accordance with this invention may be mounted for rotation on a wire rope or cable 10 which extends at an angle between an eye bolt 11 on an anchor 12 and through a pulley 13 attached to an eye bolt 14 mounted on a post 15, with a counterweight 16 attached to the free end of cable 10 to permit the cable 10 to be drawn partly through the pulley 13 as a steer S moves against the applicator A. The anchor 12 may be a relatively short post embedded in the ground 17 and the post 15 may also be embedded in the ground 17. In Fig. 2, the steer S is shown as moving underneath the applicator A to permit the same to roll along his back and part of one side, although it will be understood that when the steer S moves under the applicator from the opposite direction, the applicator will roll against part of its opposite side. Also, the steer may move forwardly against the applicator with its chest and also may step over the applicator to rub its belly and a portion of either side against the applicator. Of course, by backing into the applicator, the steer may engage the same with his rear legs and buttocks, while its ears and neck may be readily engaged as well as its chest. The tendency for steers and other animals to rub against posts, fences and the like is well known, and this tendency is taken advantage of in placing the applicator at such an angle, such as 30° to the horizontal, that the steer can readily rub underneath it or rub against it from above.

The applicator A includes a wick which is substantially saturated with a non-volatile solution, which may include a mineral oil base and a suitable insecticide for ridding the animal of insects, such as lice, flies, ticks, grubs and the like. Insecticides suitable for addition to the mineral oil base include pipernyl butoxide and pyrethrins, as for dairy cattle, or DDT, DHC and rotenone for range cattle, or any other desired type of insecticide or the like. The mineral oil may be a paraffin base oil of approximately 10 or 20 SAE.

Figure 3:
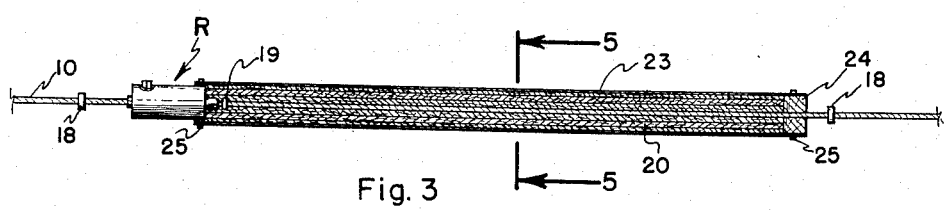
Fig. 3 is a longitudinal section of a wick and associated parts, forming a portion of the applicator.
Figure 6:
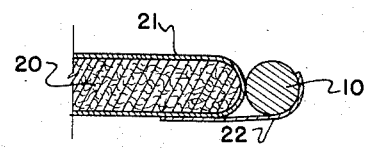
Fig. 6 is a fragmentary enlarged view, taken at the end of a block of absorbent material preparatory to rolling the same onto a wire, rope or cable.

The applicator A includes a self feeding reservoir R at the upper end, a clamp 18 being mounted on cable 10 above and below the applicator A to limit longitudinal movement thereof, although the principal longitudinal support for the applicator comprises a clamp 19 inside the same, as in Fig. 3. Clamps 18 and 19 may be cable clamps, or sleeve pressed onto the cable by several tons pressure. The applicator also includes a wick roll 20 of matting, preferably cattle hair and jute, which appears to hold the oil better than other types of absorbent material. Roll 20 may be formed by taking a section of matting, such as three feet long and six feet wide, folding a layer of burlap 21 over the same, as in Fig. 6, and attaching a piece of masking tape 22 to one side of the burlap covered matting and to the cable 10. When thus held by the masking tape, the matting is rolled onto the cable 10 to the desired dimension, as by turning the cable 10, and then secured by binder twine. Then a jacket 23, preferably formed of relatively heavy woven cotton, as of the type normally used as a fire hose covering, is slipped over the roll. The jacket 23 is longer than the length of the roll of matting 20, extending over the same at both ends, so that a wooden plug 24 may be slipped within the lower end of the jacket 23 and the reservoir R slipped within the upper end. Prior to the latter, a portion of the matting may be cut away at the upper end to receive the clamp 19. A metal strip 25 fastened by a clamp 26, such as of the "Band-It" type, may be utilized in clamping the jacket 23 securely to both the wooden plug 24 and the reservoir R. When the applicator is first twisted, the masking tape 22 is loosened from the cable and may roll therein and the masking tape merely remains inside the applicator. The above method of forming a roll is disclosed and claimed in my divisional application Serial No. 686,993, filed September 30, 1957.

The reservoir R may comprise a central pipe or tube 30, which extends centrally of and past each end of a cylindrical container 31, conveniently formed of light steel, such as 16-gauge, and is soldered, brazed, welded or otherwise suitably attached to the tube 30. In addition, a connection 32 for a filling plug 33 may be welded, brazed or otherwise suitably mounted in the side of container 31 adjacent the upper end thereof. Connection 32 conveniently comprises one-half of a small pipe union, the same nominal size as plug 33. The container 31 is filled by removing plug 33, pouring a half gallon or the like of the insecticide solution into the container, and then replacing plug 33.

After the plug 33 is replaced, the only exit for the solution from container 31 is through a small hole 34 in pipe 30, inside but adjacent the lower end of the container 31. The solution is discharged from the reservoir R only as it is used up, by being agitated through use. This is due to the fact that the oil base insecticide does not tend to flow readily through hole 34, since a vacuum is produced in container 31 and is not broken at hole 34 until the container is agitated sufficiently to cause one or more air bubbles to move from hole 34 to the top of the container through the solution. Thus, when the tube 30 is agitated, drops of the insecticide solution will be discharged through hole 34, and will move down along the cable to saturate the matting 20.

From the foregoing, it will be evident that the animal insecticide applicator of this invention fulfills to a marked degree the requirements and objects hereinbefore set forth. As will be evident, the use of a roll which turns on a cable or the like simplifies the installation and reduces the cost thereof. Also, a reservoir which feeds the desired solution to the absorbent material only upon agitation, i. e., during use of the applicator by an animal, not only insures that the absorbent material will remain saturated but also permits a considerable amount of solution to be placed in the reservoir, thereby minimizing the attention which must be paid to the applicator, while at the same time avoiding losses due to over saturation, drippage and the like. The use of a heavy woven fabric as a covering for the absorbent material produces a longer life and also causes the applicator to retain its shape longer. An important feature is the clamp on the cable, within the absorbent material, which particularly cooperates with the reservoir pipe to limit downward movement of the applicator on the cable, thereby reducing wear on the applicator by the cable and insuring that the applicator will stay in position and will rotate sufficiently freely when first engaged by an animal to assure maximum benefits. The clamping of the covering to the reservoir and to a plug at the bottom end of the absorbent material also maintains the parts accurately in position, while the use of clamps of the type described leave no protruding parts which might damage an animal during use. A further important feature is the use of a tape to roll the absorbent material onto the cable, which facilitates the making of a compact roll for insertion in the covering, yet the tape is readily loosened by a reverse twist of the applicator after attachment to the cable.

Although a specific embodiment of this invention has been illustrated and described with particularity and certain variations therein indicated, it will be understood that other embodiments of this invention may exist and various changes made therein, all without departing from the spirit and scope of this invention.

What is claimed is:

1. An applicator for applying an insecticide solution or the like to animals, comprising an anchor and a post spaced therefrom, each embedded in the ground; a pulley on said post; a cable extending at an angle to the ground, attached at its lower end to said anchor and passing at its upper end through said pulley; a counterweight attached to the free end of said cable; an elongated roll of absorbent matting extending around said cable at a position between said anchor and said post; a clamp on said cable within said roll adjacent the upper end of the latter; a jacket for said roll formed of longer wearing material than said roll, said jacket extending beyond said roll at each end thereof; a cylindrical plug surrounding said cable and extending within the lower end of said jacket; a hollow cylindrical container extending within the upper end of said jacket and having a removable filling plug adjacent the upper end thereof; a pipe surrounding said cable and attached axially to said container, said pipe extending from each end of said container and having a hole within but adjacent the lower end of said container; and a clamp surrounding said jacket at each end and clamping said jacket respectively to said plug and to said container.

2. In an applicator for applying an insecticide solution or the like to animals, and adapted to be mounted on a cable extending at an angle to the ground, comprising an elongated roll of absorbent matting extending around said cable; a clamp on said cable within said roll adjacent the upper end of the latter; a jacket for said roll formed of longer wearing material than said roll, said jacket extending beyond said roll at each end thereof; a cylindrical plug surrounding said cable and extending within the lower end of said jacket; a hollow cylindrical container extending within the upper end of said jacket and having a removable filling plug adjacent the upper end thereof; a pipe surrounding said cable and attached axially to said container, said pipe extending from each end of said container and having a hole within but adjacent the lower end of said container; and a clamp surrounding said jacket at each end and clamping said jacket respectively to said plug and to said container.

3. In an applicator for applying an insecticide solution or the like to animals, including a supporting cable or the like extending at an angle to the ground and a roll of absorbent material adapted to rotate about said cable, the improvement comprising a reservoir for supplying said solution and rotatable about said cable with said roll, said reservoir including a central pipe surrounding said cable and having a hole therein and extending to said roll, and a container surrounding said pipe, said hole being within said container and said solution passing through said hole and along said cable to said roll.

4. In an applicator as defined in claim 3, wherein said container is formed of metal and is provided with a half-union attached in an aperture adjacent the upper end thereof; and a plug threadedly engaging said half-union.

5. An applicator for applying an insecticide solution or the like to animals comprising a cable extending at an angle to the ground, comprising an elongated roll of absorbent material extending around and rotatable about said cable; a reservoir for containing an insecticide solution and disposed at the upper end of said roll, said reservoir rotatably surrounding said cable and provided with means for feeding said solution to said roll substantially only as said reservoir moves on said cable; a jacket formed of porous, longer wearing material than said roll and surrounding said roll, said jacket also surrounding at least a portion of said reservoir; and means attaching said jacket to said reservoir so that said reservoir will move with said jacket upon engagement of said jacket by an animal.

6. In an applicator for applying an insecticide solution or the like to animals, a cable to be mounted so as to extend at an angle to the ground; an elongated roll mounted on said cable for rotation therearound, said roll including layers of absorbent matting with burlap interposed there between; a jacket surounding said roll and formed of longer wearing material than said roll, said jacket extending beyond the upper end of said roll; a reservoir for containing an insecticide solution and surrounding said cable, said reservoir extending within the upper end of said jacket and being provided with means for feeding insecticide to the interior of said roll upon movement of said roll relative to said cable and movement of said reservoir with said roll; and means for attaching said jacket to said reservoir.

References Cited in the file of this patent

UNITED STATES PATENTS

| | | |
|---|---|---|
| 797,035 | Whitaker, Jr. | Aug. 15, 1905 |
| 1,046,595 | Hudson | Dec. 10, 1912 |
| 1,406,300 | Swett | Feb. 14, 1922 |
| 1,478,178 | Doty | Dec. 18, 1923 |
| 1,705,256 | Krusi | Mar. 12, 1929 |
| 2,438,731 | Wedeking | Mar. 30, 1948 |
| 2,667,859 | Murray et al. | Feb. 2, 1954 |
| 2,669,968 | Rasmussen | Feb. 23, 1954 |
| 2,688,950 | McKinley | Sept. 14, 1954 |
| 2,765,775 | Kramer | Oct. 9, 1956 |